A. C. LINDGREN.
COMBINED FERTILIZER DISTRIBUTER AND SEED PLANTER.
APPLICATION FILED JUNE 8, 1908.
968,671.
Patented Aug. 30, 1910.
5 SHEETS—SHEET 3.
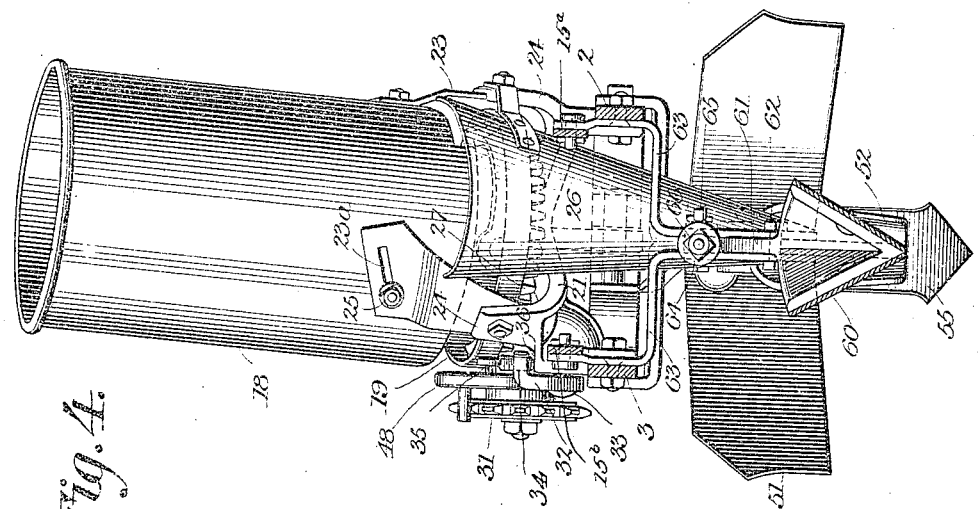
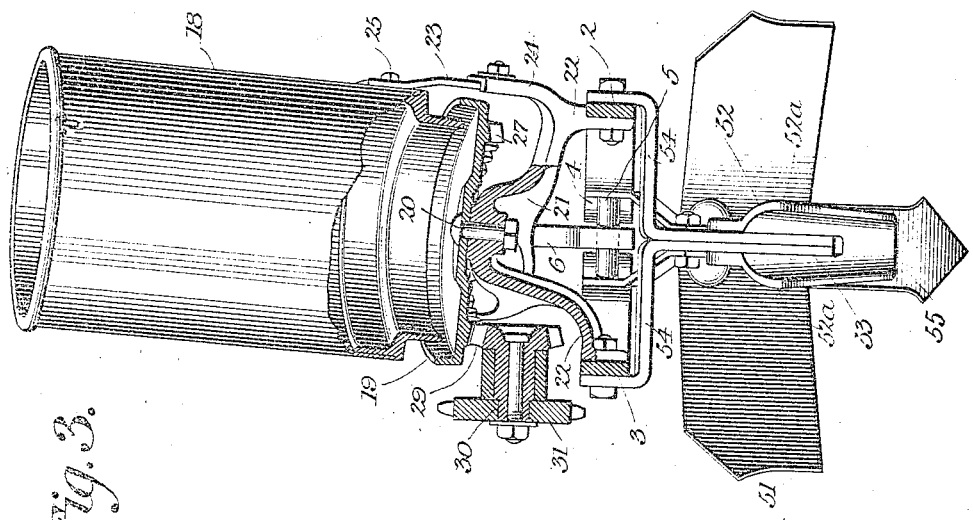
Witnesses
Raymond F. Barnes
L. E. Thorman
Inventor
A. C. Lindgren
By P. F. Dodge
Attorney A. C. LINDGREN.
COMBINED FERTILIZER DISTRIBUTER AND SEED PLANTER.
APPLICATION FILED JUNE 8, 1908.
968,671.
Patented Aug. 30, 1910.
5 SHEETS—SHEET 4.
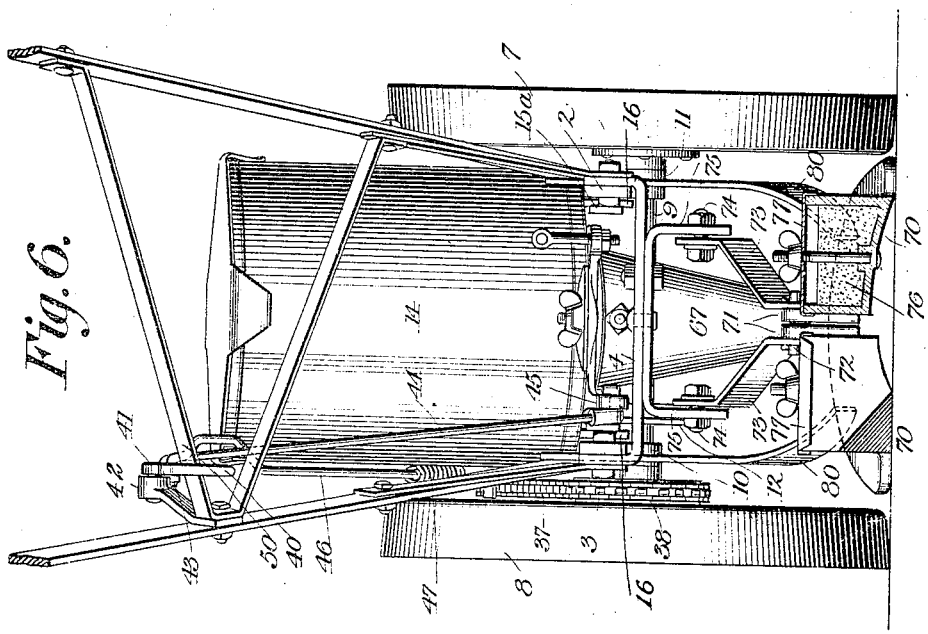
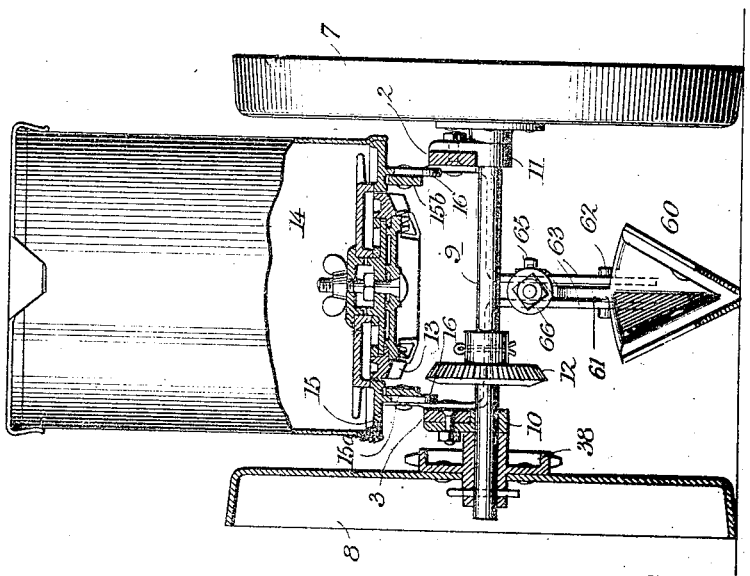

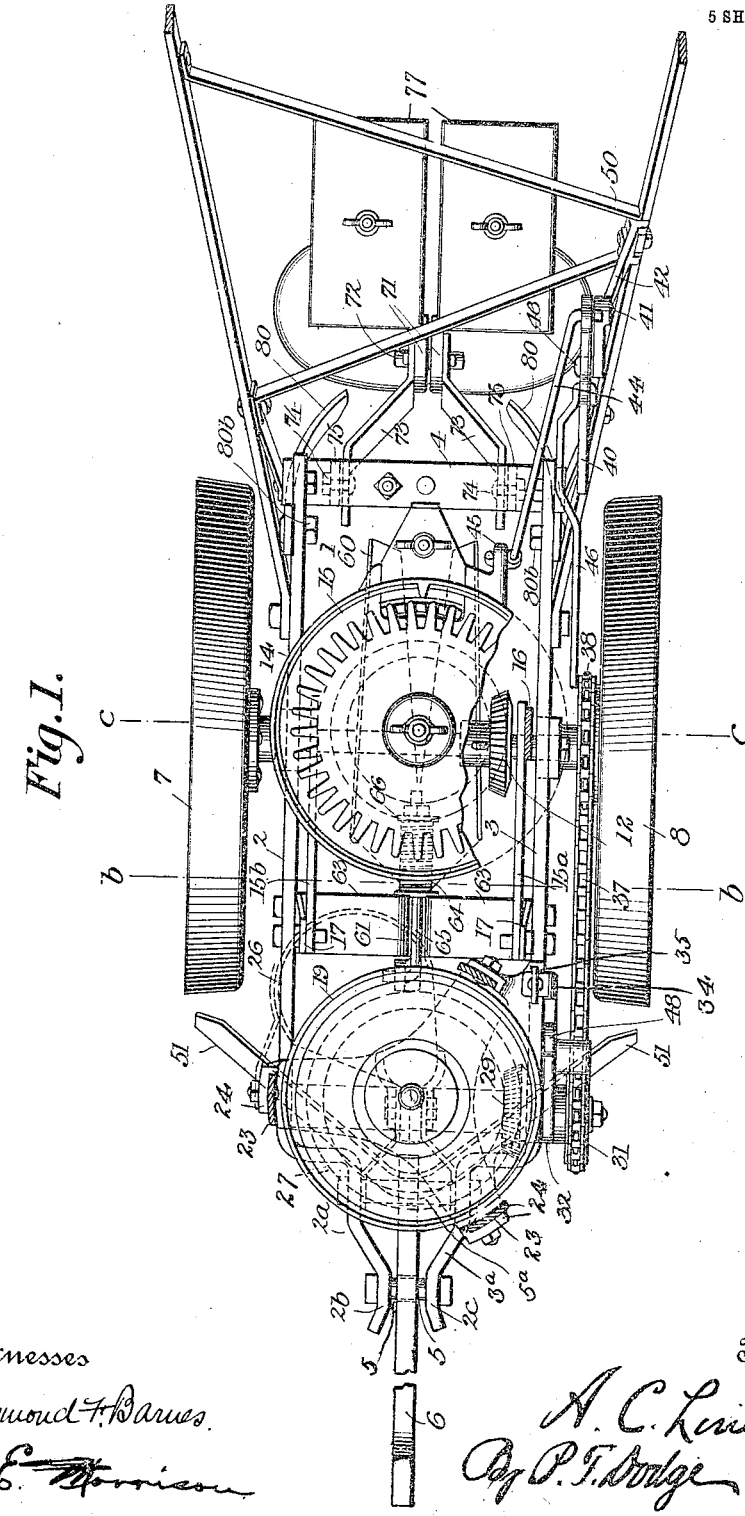

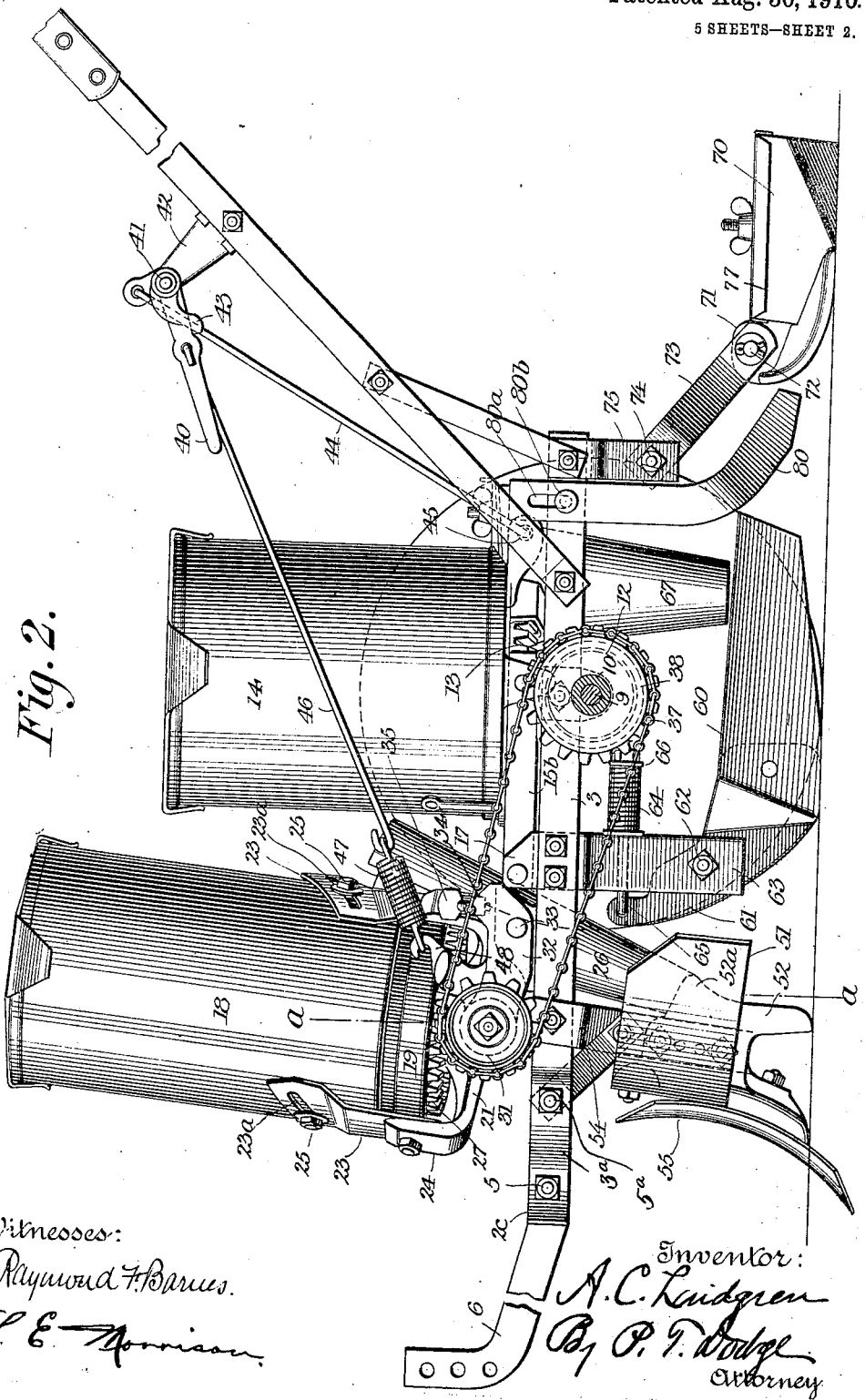

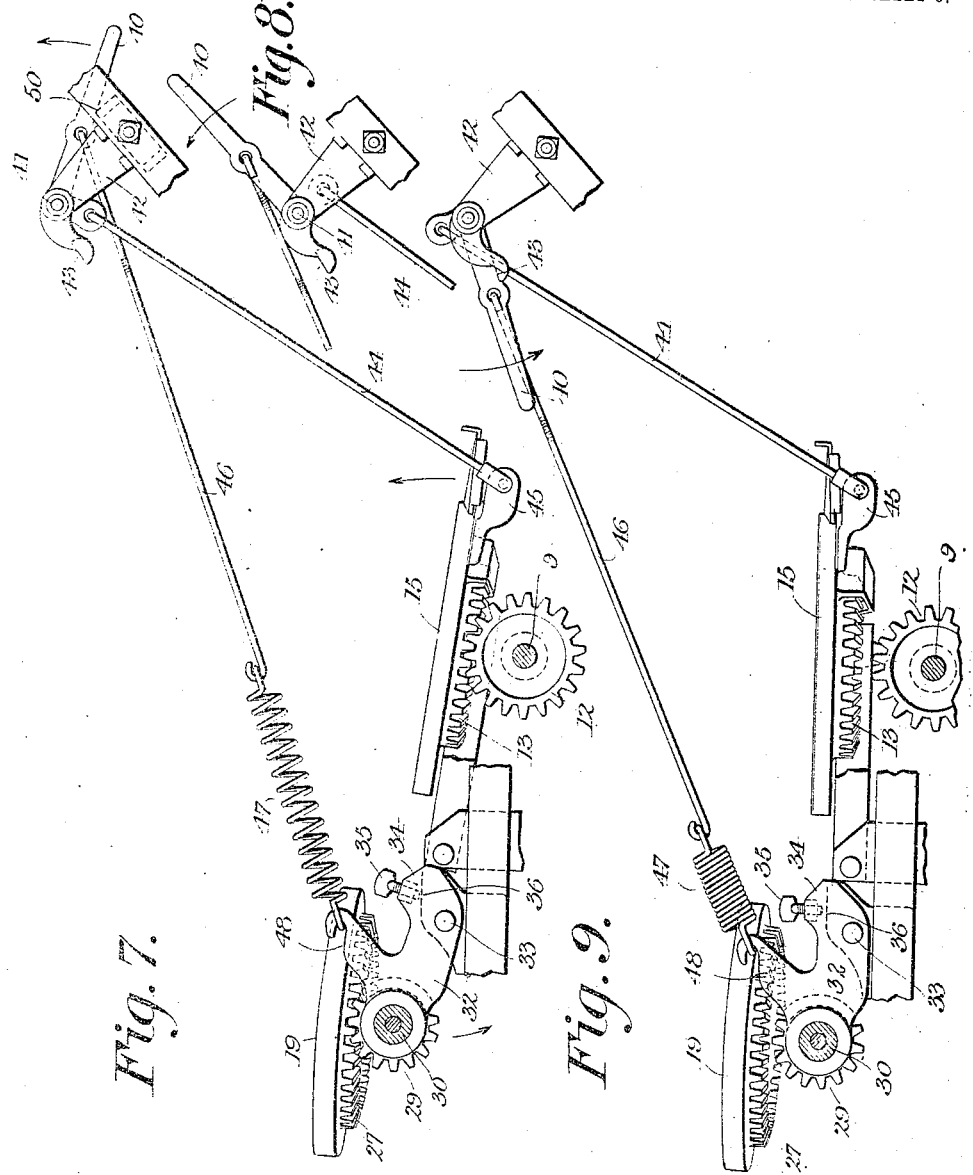

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

COMBINED FERTILIZER-DISTRIBUTER AND SEED-PLANTER.

968,671.

Specification of Letters Patent.   Patented Aug. 30, 1910.

Application filed June 8, 1908.   Serial No. 437,276.

*To all whom it may concern:*

Be it known that I, ALEXUS C. LINDGREN, of Moline, county of Rock Island, and State of Illinois, have invented a new and useful Improvement in Combined Fertilizer-Distributers and Seed-Planters, of which the following is a specification.

This invention relates to a combined fertilizer distributer and seed planter for planting either corn or cotton seed, and has reference more particularly to that type of machines embodying a wheeled frame equipped with suitable furrow opening and covering devices, a fertilizer distributing device, and a seed dropping mechanism, operated from the ground wheels, the machine acting as it is advanced over the field, to deposit the fertilizer in a furrow, cover the same with soil, form a furrow for the seed, deposit the seed in its furrow, and finally cover the seed.

The invention consists in various improvements in machines of this character designed to render the same compact and strong, and its operative parts readily controllable; whereby the machine is well adapted for work in crooked and contracted rows.

The invention consists also in the details of construction and combination of parts hereinafter described and claimed.

In the accompanying drawings:—Figure 1 is a top plan view of my improved machine, parts being removed to expose other parts to view. Fig. 2 is a side elevation of the same. Fig. 3 is a vertical transverse section on the line $a$—$a$ of Fig. 2. Fig. 4 is a similar view on the line $b$—$b$ of Fig. 1. Fig. 5 is a similar view on the line $c$—$c$ of Fig. 1. Fig. 6 is a rear elevation of the machine partly in section. Fig. 7 is a side elevation on an enlarged scale of the hand lever mechanism for controlling the operation of the fertilizing mechanism and the seed dropping mechanism, said lever being in the position it occupies when the said mechanisms are in operation. Fig. 8 is a similar view showing the lever and parts connected therewith in intermediate position. Fig. 9 is a similar view showing the lever in the position it occupies when the operative mechanisms are thrown out of action.

Referring to the drawings:—1 represents a rectangular frame, consisting of two longitudinally extending metal side-bars 2 and 3, connected at their rear ends by a cross-bar 4, having its ends upturned and seated against and secured to the outer sides of the side-bars, which latter at their forward ends extend inwardly toward each other, then longitudinally forward parallel to each other some distance apart, as at $2^a$ and $3^a$, their forward extremities being finally curved inward toward each other forming convex bearing surfaces $2^b$ and $2^c$. The parallel portions $2^a$ and $3^a$ of the frame and the forward curved extremities of the same are spaced apart and connected in fixed relations by means of spacing spools 5 and $5^a$ respectively as shown in Fig. 1, connected to said parts by through bolts, which spools extend loosely through openings in the rear end of a draft bar 6, to which the draft animals may be attached, the arrangement being such that said bar may rock laterally and freely on the spools between the convex portions of the frame-bars.

The frame is sustained by ground wheels 7 and 8, fixedly connected to the outer ends of a horizontal axle 9 mounted loosely in bearing blocks 10 and 11 fixed to the frame-bars at a point about midway between the ends of the frame, so that as the machine is advanced, motion will be imparted to the axle and by it transmitted to the discharging mechanisms, as will be presently described.

The ground wheels may be of any appropriate construction, but I prefer to construct them of disk-like form of heavy pressed steel with an integral annular flange to form the tread, and a malleable hub firmly bolted to the body, a wheel of this construction being very durable and not liable to gather trash or weeds.

Inward of the bearing block 10, the axle has fixed to it a bevel pinion 12 adapted to mesh with a horizontal bevel gear 13 in the bottom of the seed can or hopper 14, which gear operates a seeding mechanism which may be of a form to discharge corn, cotton seed, or other kind of seed as desired. The bottom of the can is in the form of a plate 15, in which the gear and the seed discharging mechanism are mounted, which plate is so sustained that it may be raised bodily to disengage the gear from its driven pinion when the seeding mechanism is to be rendered inoperative. This is conveniently effected by pivoting the plate to the frame-bars by means of two longitudinally extending horizontal links 15ª and 15ᵇ jointed at their rear ends to depending ears 16 on the sides of the plate 15 and extending forwardly therefrom along the inner sides of the frame-bars, with their forward ends jointed respectively to brackets 17 on the frame-bars. From this construction it will be seen that the seed can with its operating mechanism is movable bodily upward and downward on a transverse axis situated in front of the can, the upward movement of the can acting to disengage its gear from the driving pinion on the shaft, while its opposite movement acts to engage said gear and pinion. The control of these movements is effected by a lever mechanism shown more particularly in Figs. 7, 8 and 9, which also controls the fertilizer distributing mechanism, and which will be described later on.

The fertilizer is contained in a fixed hopper or can 18 open at its bottom and seated over a horizontal rotary distributing wheel or disk 19 having an upwardly extending flange within which the bottom of the hopper extends. As shown more particularly in Fig. 3, the distributing wheel is journaled by means of a vertical bolt 20 on the central elevated portion of a bracket plate 21 provided with outwardly extending arms 22 turned downwardly at their ends and seated against and secured to the inner sides of the frame-bars 2 and 3. The hopper or can is sustained rigidly in position, with its lower end some distance above the bottom of the distributing wheel, by means of three bracket plates 23 secured at their lower ends to upwardly extending lugs 24 on the bracket plate 21, and having formed in their upper ends diagonal slots 23ª, the can being seated between these bracket plates and fastened firmly to the same by means of bolts 25 extending through the can body and slots and confined by clamping nuts, the diagonal slots admitting of an adjustment of the can vertically with reference to the face of the distributing wheel, so as to vary the distance between the wheel and lower end of the can, and correspondingly vary the amount of fertilizer discharged. The fertilizer is discharged by the rotation of the wheel, which acts to cause the fertilizer to flow over the edge of the flange on the wheel, from which it is directed into the ground by means of a spout or conductor 26 connected to one of the lugs 24 on the bracket plate 21.

It will be understood of course that other forms of distributing mechanisms may be substituted in lieu of that described, the essential idea in this respect being that the fertilizer be discharged by mechanism at the front of the machine, in advance of the discharge of the seed.

The distributing wheel is provided with bevel gear teeth 27 adapted to be engaged by a vertical bevel driving pinion 29 on the inner end of a short shaft or stud 30 having a sprocket wheel 31 fixed to its outer end and mounted to rotate in a bearing in the forward end of a plate 32 pivoted near its rear end on a horizontal transverse bolt 33 to the side of an extension on the bracket plate 21, so that the plate may rock on said axis and cause the pinion to be engaged with or disengaged from the gear teeth 27, as desired.

Rearward of the pivotal axis 33 of the plate, the latter is formed with an upward extension 34, see particularly Fig. 9, through which is screwed a vertical adjusting bolt 35, the lower end of which is adapted to engage against a ledge or shoulder 36 on the extension of the bracket plate, by which means the plate 32 may be so adjusted as to hold the pinion permanently out of engagement with the teeth of the distributing wheel, in the event that it is desired to discontinue the distribution of the fertilizer for any period of time. The sprocket wheel 31 receives motion from the ground wheels through the medium of a sprocket chain 37 passing over a sprocket wheel 38 fixed to the inner side of the ground wheel 8, and over the sprocket wheel 31.

Referring now to Figs. 7, 8 and 9, which show the mechanism by means of which the attendant may at will engage and disengage the distributing mechanisms with their driving means, 40 represents a hand lever in the form of an elbow lever pivoted at its angle, as at 41, to a bracket 42 projecting upwardly from one of the handles of the machine, the upper end of said bracket being extended forwardly and then laterally to form a stop-projection 43 against which the hand lever is adapted to abut when thrown forwardly as shown in Fig. 9. Connected with the rear end of the elbow lever is a rod 44 which extends downwardly and has its lower end jointed to an ear 45 on the plate 15 of the seed discharging mechanism. At a point between the forward end of the lever 40 and its point of pivotal connection with the bracket, there is connected the rear end of a rod 46, whose opposite end is connected with one end of a coiled spring 47 having its opposite end connected with the upper end of a finger 48 extending upwardly and rearwardly from the plate 32 carrying the driving pinion for the fertilizer distributer, the relation of said finger to the plate and rod 46 being such that when said rod is drawn endwise rearwardly, it will act to rock the plate upwardly on its pivotal axis 32 and raise the bevel pinion 29 upwardly into engagement with the bevel teeth on the fertilizer distributing wheel. When the distributing mechanisms are to be thrown into action, the hand lever 40 is moved to its extreme rearward position, as shown in Fig. 7, which action will push rod 44 downward and lower the plate 15 of the seed discharging mechanism and engage the bevel gear 13 with its driving pinion 12. At the same time, rod 46 will be drawn to the rear and will rock plate 32 on its axis and elevate the bevel pinion carried by the plate into engagement with the bevel teeth of the fertilizer distributing wheel, so that both of these mechanisms will be in action. In this position of the parts, the hand lever mechanism will be locked by the pull of the spring (which had been placed under tension) on the lever 40, which pull is exerted in such direction that it tends to hold the hand lever rearward, and as its further rearward movement is limited by a stop 50 on the frame, the lever is held yieldingly in its rearward position. When, now, it is desired to throw the mechanism out of action, the hand lever is pushed upwardly and forwardly, which action will raise the rod 44 and lift plate 15 and the seed driving gear 13 out of engagement with the bevel pinion 12, and will at the same time push rod 46 forward, thereby releasing the tension of the spring and the plate 32 will rock downwardly on its axis by gravity and disengage its bevel pinion from the teeth of the distributing wheel. The further forward motion of the hand lever is limited by means of the stop projection 43 on the bracket 42, before alluded to. It is seen therefore that by the single hand lever, the two distributing mechanisms are adapted to be rendered operative and inoperative alternately, the forward throw of the hand lever serving to lift the seed operating gear out of engagement with its driving pinion and to simultaneously permit the driving pinion of the fertilizer distributing mechanism to be lowered out of engagement with the distributing mechanism; and the rear motion of the lever acting to lower the operating gear of the seed mechanism, and at the same time acting to elevate the driving pinion of the fertilizer mechanism into engagement with said mechanism. The said hand lever is locked in its two positions by reason of the fact that when thrown rearward, the point of connection of the rod 46 with said hand lever passes back of the pivotal connection of said hand lever with the bracket; and when in its forward position the point of connection of the rod 44 with the hand lever passes forward of the connection of said hand lever with the bracket.

At its forward end, the frame is provided with a sweep 51 in the form of a plate fixed to the forward face of a frog 52 and diverging rearwardly and outwardly therefrom. The frog is recessed vertically to receive a standard 53 formed by means of two plates 54 fixed at their upper ends to the side bars of the frame and extending transversely inwardly toward each other and then downwardly vertically side by side, the downward extensions of the plates being seated in the recess in the frog, to which the latter is firmly bolted and on which it is adjustable vertically. Below the sweep, the frog is extended downwardly in order to receive a furrow opening blade 55 which is seated against the front face of the extension on the frog and to which it is firmly bolted, a number of holes being formed in the blade in order to provide for its vertical adjustment to vary the depth of the furrow. The spout 26, into the upper end of which the fertilizer is discharged, has its lower end seated immediately behind the sweep so as to direct the fertilizer into the furrow formed by the opener 55. In order that the lower end of the spout may be securely held in position and prevented from being displaced, the frog 52 has projecting rearwardly from it, two outwardly curved flanges $52^a$ forming between them a semi-circular socket extending rearwardly and downwardly, into the upper end of which, the lower end of the spout fits.

Sustained by the frame in rear of the fertilizer spout is a device 60, the function of which is to cover the deposited fertilizer and at the same time form a furrow for the seed. This device consists of two longitudinal plates separated at their lower edges and extending upwardly and outwardly, forming a V-shaped space between them, their forward ends being connected together and curved upwardly and forwardly, at which point the device is provided with an upward extension 61 pivoted on a horizontal axis 62 between the lower ends of two vertical arms 63 extending upwardly and outwardly and fixed at their outer ends to the side bars of the frame. This device is acted on by a spring 64, so arranged that it is pressed yieldingly downward on the ground. This action is effected by means of a horizontal rod 65 jointed at its forward end to the upward extension 61 and extending rearwardly between the two arms 63, a head 66 being applied to the rear end of the rod. The spring is of spiral form and encircles the rod in rear of the arms, bearing at its forward end against said arms and at its rear end against the head, and tending by its expansion to force the rod rearward, thereby pulling rearward on the extension 61, by which means the connected plates are forced downward at their rear ends. The seed from the seed hopper enters the upper end of a seed spout 67, the lower end of which terminates substantially between the two plates 60 near their rear ends. These plates are sustained at a considerably higher level than the forward furrow opening blade 55, so that they act at their forward curved ends, on the soil thrown up at the sides of the furrow formed by the blade 55, and they force the soil downward on the fertilizer which is covered thereby, at the same time forming a seed-furrow over the covered fertilizer, into which the seed is directed by the spout 67.

In the rear of the seed spout and sustained by the rear end of the frame is a seed covering device in the form of two weighted shoes 70, provided at their forward ends with upwardly extending ears 71 connected by means of a horizontal transverse pivot bolt 72 between the lower ends of two arms 73 extending upwardly and outwardly and jointed at their upper ends, by means of two horizontal transverse pivot bolts 74, to downwardly extending ears 75 fixed to the rear cross-bar 4 before alluded to. The bottoms of the shoes are widened at the front, are concaved slightly on their under sides in a transverse direction, and curved upwardly at their forward ends, and as they are drawn over the ground with a floating action, they press the sides of the seed furrow inwardly and downwardly, thereby effectually covering the deposited seed and smoothing and packing the soil down thereon. The shoes are provided with boxes 76, in which sand or soil may be filled to give them the proper weight, lids 77 being provided to cover the boxes, which are held in place by nuts screwed on the upper ends of vertical bolts extending upwardly through the boxes and through the lids.

In order that the soil thrown outward by the sweep 51 may be pushed inwardly within reach of the concave surfaces of the shoes, to the end that the latter will act to effectually cover the seed, I provide at the rear end of the frame on opposite sides, deflecting blades 80 in the form of vertical plates connected at their upper ends with the side-bars of the frame and extending downward therefrom and curved inwardly toward each other so as to extend within the outer limits of the bottoms of the shoes, and also curved rearwardly. These deflecting blades will act as the machine is advanced to force the soil thrown outward by the sweep inwardly toward the covering shoes and within the path of the same, so that the soil is thus caused to be smoothed over and packed down on the deposited seed. These blades are connected with the frame so that they may be adjusted vertically, which is conveniently effected by forming in their upper ends vertical slots 80ᵃ which receive fastening bolts 80ᵇ extending through said slots and through the frame bars.

Having thus described my invention, what I claim is:—

1. In a machine of the type described, the combination of a frame, an axle mounted therein, ground wheels on the axle, a vertical drive pinion on the axle, a seed discharging mechanism including a driving gear adapted to be engaged by the vertical drive pinion and movable vertically to disengage said pinion, a fertilizer distributing mechanism sustained by the frame, a driving pinion for said mechanism movable to engage and disengage the same, a hand lever, means connecting the hand lever operatively with the driving pinion for the fertilizer mechanism, and means connecting the hand lever with the vertically movable gear for the seed discharging mechanism; whereby said hand lever is adapted to control the operation of both mechanisms.

2. In a machine of the type described, the combination of a frame, an axle mounted thereon, ground wheels on the axle, a vertical bevel gear fixed to said axle, a seed hopper having a bottom plate sustained by the frame and movable vertically, a horizontal bevel gear mounted in said plate and adapted to be engaged by the vertical driving pinion, a fertilizer distributing mechanism including a rotary distributing wheel formed with gear teeth, a vertical driving pinion adapted to engage said gear teeth, a vertically movable bearing plate in which said pinion is mounted, a hand lever pivoted to the frame, a connection between the hand lever and the vertically movable plate of the seed discharging mechanism, a connection between the hand lever and the vertically movable bearing plate, and means for driving the pinion of the fertilizer distributing mechanism from the ground wheels.

3. In a machine of the type described, the combination of the frame, ground wheels sustaining the same, a driving pinion operated by the ground wheels, a vertically movable seed hopper provided with a seed discharging mechanism and adapted to be rotated by the driving pinion, an elbow lever pivoted at its angle to the frame, a rod connecting the end of said elbow lever with the hopper; whereby when said hand lever is thrown to the rear the hopper will be lowered into action, a fertilizer distributing mechanism sustained by the frame, a vertically movable driving pinion adapted by its vertical movements to engage and disengage the fertilizer distributing mechanism, a vertically movable bearing plate in which said pinion is mounted, a spring connected with said bearing plate, and a rod connected at one end with the spring and at its opposite end with the hand lever at a point between the end of said hand lever and its point of pivotal connection with the frame; whereby when the hand lever is thrown to the rear to engage the seeding mechanism, the spring will be placed under tension and will act to elevate the fertilizer driving pinion into engagement with the fertilizer mechanism, the relation of the parts being such that when in this position the point of connection of the rod last named with the hand lever will pass below the point of pivotal connection of said lever with the frame; whereby the tension of the spring will act to hold the lever in its rearward position and with both mechanisms in action.

4. In a machine of the type described, the combination of the frame, ground wheels sustaining the same, a driving pinion operated by the ground wheels, a vertically movable seed hopper provided in its bottom with seed discharging mechanism adapted to be operated by the driving pinion, a hand lever pivoted to the frame, a rod connecting the end of said hand lever with the seed hopper, the relation of the parts being such that when the hand lever is thrown forward, the rod will be raised and will act to elevate the seed hopper and disengage the mechanism from the driving pinion, a fertilizer distributing mechanism, a vertically movable driving pinion for the same, a vertically movable bearing plate in which said driving pinion is mounted, said bearing plate being adapted to move downward by gravity; whereby the pinion will be disengaged from the fertilizer distributing mechanism, a spring and rod connecting the hand lever with the bearing plate and acting when said hand lever is thrown to the rear to place the spring under tension and elevate the bearing plate, and acting when the hand lever is thrown forward to relieve the spring of tension and permit the bearing plate to fall by gravity and disengage the gear from the fertilizer distributing mechanism; whereby when said hand lever is thrown forward to disengage the seed discharging mechanism, it will act automatically to cause the disengagement of the fertilizer distributing mechanism.

5. In a machine of the type described, the combination with the frame, of a fertilizer distributing mechanism mounted thereon and including driven and driving members movable one with reference to the other to disengage them, a seed discharging mechanism also mounted on the frame and including driven and driving members movable one relatively to the other to disengage them, a single controlling lever, a connection between said lever and the movable member of the fertilizer distributing mechanism, and a separate connection between the lever and the movable member of the seed discharging mechanism, and means for rotating the driving members of said mechanisms.

6. In a machine of the type described, the combination with the frame, of a fertilizer distributing mechanism mounted thereon and including a driven and a driving member one movable relatively to the other to disengage them, a seed discharging mechanism mounted on the frame and including a driven member and a driving member one movable relatively to the other to disengage them, and in a direction opposite the disengaging movement of the movable member of the fertilizer distributing mechanism, a single controlling lever, and connections between said lever and the movable members of said mechanisms.

In testimony whereof I hereunto set my hand this twenty fourth day of April, 1908, in the presence of two attesting witnesses.

ALEXUS C. LINDGREN.

Witnesses:
J. L. IRVING,
CLYDE KING.